US012270397B2

United States Patent
Mork et al.

(10) Patent No.: US 12,270,397 B2
(45) Date of Patent: *Apr. 8, 2025

(54) PUMP CONFIGURATION INCLUDING A PURGE VALVE FOR REMOVING AIRLOCKS

(71) Applicant: Caterpillar Inc., Peoria, IL (US)

(72) Inventors: David A Mork, Yorkville, IL (US); Paul R English, Washington, IL (US); Matthew Mickiewicz, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,395

(22) Filed: Dec. 22, 2023

(65) Prior Publication Data
US 2024/0125323 A1    Apr. 18, 2024

Related U.S. Application Data

(63) Continuation of application No. 17/404,202, filed on Aug. 17, 2021, now Pat. No. 12,025,123.

(51) Int. Cl.
*F04C 14/24* (2006.01)
*F04C 2/18* (2006.01)
*F16K 15/02* (2006.01)

(52) U.S. Cl.
CPC ............. *F04C 14/24* (2013.01); *F04C 2/18* (2013.01); *F16K 15/025* (2013.01)

(58) Field of Classification Search
CPC .......... F04C 14/24; F04C 2/18; F16K 15/025
See application file for complete search history.

(56) References Cited

U.S. PATENT DOCUMENTS

| 2,270,222 A | 1/1942 | Herbert et al. |
| 3,901,628 A | 8/1975 | Bornholt et al. |
| (Continued) | | |

FOREIGN PATENT DOCUMENTS

| CN | 202464788 | 10/2012 |
| CN | 105715542 | 5/2019 |
| (Continued) | | |

OTHER PUBLICATIONS

"U.S. Appl. No. 17/404,202, Non Final Office Action mailed Sep. 29, 2022", 15 pgs.

(Continued)

*Primary Examiner* — Mary A Davis
(74) *Attorney, Agent, or Firm* — Schwegman Lundberg & Woessner, P.A.

(57) ABSTRACT

A pump and purge valve configuration may include an inlet, an outlet arranged downstream of the inlet and defining a portion of an operational fluid pathway, and a pump mechanism arranged along the operational fluid pathway between the inlet and the outlet. The pump and purge valve configuration may also include a purging fluid pathway having a purge inlet in fluid communication with the operational fluid pathway at a point downstream of the pump. The purging fluid pathway may extend from the purge inlet to a relief point. The pump and purge valve configuration may also include a purge valve arranged along the purging fluid (Continued)

pathway. The purge valve may be configured to remain open unless a triggering fluid pressure develops in the pump mechanism.

7 Claims, 15 Drawing Sheets

(56) References Cited

U.S. PATENT DOCUMENTS

| | | | |
|---|---|---|---|
| 4,371,318 | A | 2/1983 | Kime |
| 6,068,016 | A | 5/2000 | Manofsky, Jr. et al. |
| 6,729,855 | B2 | 5/2004 | Havlik et al. |
| 7,198,060 | B2 | 4/2007 | Hiser |
| 8,753,097 | B2 | 6/2014 | Cedrone et al. |
| 8,915,719 | B2 | 12/2014 | Street |
| 9,388,809 | B2 | 7/2016 | Denny |
| 10,677,199 | B2 | 6/2020 | Hashimoto et al. |
| 11,067,100 | B2 | 7/2021 | Enevoldsen et al. |
| 12,025,123 | B2 * | 7/2024 | Mork .................. F04C 2/18 |
| 2023/0059905 | A1 | 2/2023 | Mork et al. |

FOREIGN PATENT DOCUMENTS

| | | |
|---|---|---|
| ES | 2006279 | 4/1989 |
| WO | 2022251157 | 12/2022 |

OTHER PUBLICATIONS

"U.S. Appl. No. 17/404,202, Response filed Dec. 29, 2022 to Non Final Office Action mailed Sep. 29, 2022", 10 pgs.

"U.S. Appl. No. 17/404,202, Non Final Office Action mailed Jun. 8, 2023", 12 pgs.

"U.S. Appl. No. 17/404,202, Examiner Interview Summary mailed Jun. 13, 2023", 1 pg.

"U.S. Appl. No. 17/404,202, Response filed Sep. 6, 2023 to Non Final Office Action mailed Jun. 8, 2023", 6 pgs.

"U.S. Appl. No. 17/404,202, Notice of Allowance mailed Feb. 14, 2023", 9 pgs.

"U.S. Appl. No. 17/404,202, Notice of Allowance mailed Oct. 16, 2023", 8 pgs.

* cited by examiner

PUMP CONFIGURATION INCLUDING A PURGE VALVE FOR REMOVING AIRLOCKS

CLAIM OF PRIORITY

This application is a continuation of U.S. patent application Ser. No. 17/404,202, filed on Aug. 17, 2021, the benefit of priority of which is claimed hereby, and which is incorporated by reference herein in its entirety.

TECHNICAL FIELD

The present application relates generally to fluid pumps. More particularly, the present application relates to fluid pumps such as those used on vehicles, work machines, or other equipment. Still more particularly, the present application relates to fluid pumps for charging accumulators of brake systems of mobile equipment.

BACKGROUND

Fluid pumps may be used for hydraulic systems for operating truck hoists, excavation arms, lift buckets, brakes, and other actuatable elements on equipment, work machines, and vehicles. The fluid pump may commonly be relied on for delivering and/or moving fluid from a tank or reservoir into and through a hydraulic system. The fluid pump may commonly draw fluid from the tank or other source of fluid into an inlet at relatively low pressure. The fluid pump may deliver or push the fluid out of an outlet and into a system that may be adapted to perform work. Depending on the condition of the system the fluid exiting the pump may be at high or low pressure. That is, unless/until the system imparts resistance to the fluid flow out of the outlet of the pump, the fluid may be at relatively low pressure. As resistance to flow is developed, the pressure of the fluid leaving the pump may be at much greater pressure. That is, due to the incompressible nature of hydraulic or drivetrain fluid, when flow resistance is created, and consistent amounts of fluid continue to exit the pump, pressure is generated. In the case of pumps for charging brake accumulators, for example, pressures approaching or exceeding 3000 psi may develop.

In some circumstances, however, air or another compressible fluid may find its way into the hydraulic system. When a pump encounters air, the pump's efficiency may drop immensely because the flow of compressible fluids may be much more difficult to generate. In particular, the pump may not be able to develop sufficient pressure to eject the air and create a reduced pressure at the inlet side that is sufficiently below atmospheric or other internal system pressures to cause fluid to flow toward the inlet. Without access to fluid, pressures may not develop, or at least high pressures may not develop, from operation of the pump. In these circumstances, a pump may be "air locked," so to speak. Operation of the pump in this condition may be ineffective to perform operations and, over a period of time, can cause damage to the pump. This problem may correct itself over time if gravity or other internal system pressures urge fluid toward the pump. However, some pumps may need to run quite immediately upon startup of a machine or vehicle. One example of this is a brake charging system where a pump is used to charge the accumulators that provide pressurize fluid to the brake system.

U.S. Pat. No. 8,915,719 relates to a cryogenic reciprocating pump intermediate distance piece. The system provides heating elements into the nose of an intermediate distance piece of a cryogenic reciprocating pump in order to warm the piston packing seals of the pump. The heating elements increase the temperature of the piston packing seals to limit deformation of the seals while the pump is in operation. In addition, a warm, dry vapor purge may be provided to the interior of the intermediate distance piece to reduce or eliminate rime from interfering with the piston packing seals.

SUMMARY

In one or more embodiments, a pump and purge valve configuration may include an inlet, an outlet arranged downstream of the inlet and defining a portion of an operational fluid pathway, and a pump mechanism arranged along the operational fluid pathway between the inlet and the outlet. The pump and purge valve configuration may also include a purging fluid pathway having a purge inlet in fluid communication with the operational fluid pathway at a point downstream of the pump mechanism. The purging fluid pathway extends from the purge inlet to a relief point. The pump and purge valve configuration may also include a purge valve arranged along the purging fluid pathway. The purge valve may be configured to remain open unless a triggering fluid pressure develops in the pump mechanism.

In one or more embodiments, a pump and purge valve configuration may include a housing defining a pump cavity, an inlet on a first side of the housing in fluid communication with the pump cavity, and an outlet on a second side of the housing opposite the first side. The outlet may be in fluid communication with the pump cavity and may define an operational fluid pathway between the inlet and the outlet. The pump and purge valve configuration may also include a pump mechanism arranged within the pump cavity and along the operational fluid pathway. The pump and purge valve configuration may also include a purging fluid pathway having a purge inlet formed in the housing on a downstream side of the pump along the operational fluid pathway. The purging fluid pathway may extend through the housing to an exterior surface of the housing. The pump and purge valve configuration may also include a purge valve arranged along the purging fluid pathway. The purge valve may be configured to remain open unless a triggering fluid pressure develops in the pump mechanism.

In one or more embodiments, a purge manifold for attachment to a downstream side of a pump may include a containment element defining a chamber. The purge manifold may also include a purge inlet in fluid communication with the chamber and defining a beginning of a purging fluid pathway. The purge manifold may also include a purge valve arranged along the purging fluid pathway, the purge valve configured to remain open unless a triggering fluid pressure develops in the pump and along the purging fluid pathway to the purge valve.

DETAILED DESCRIPTION

Figure 1:
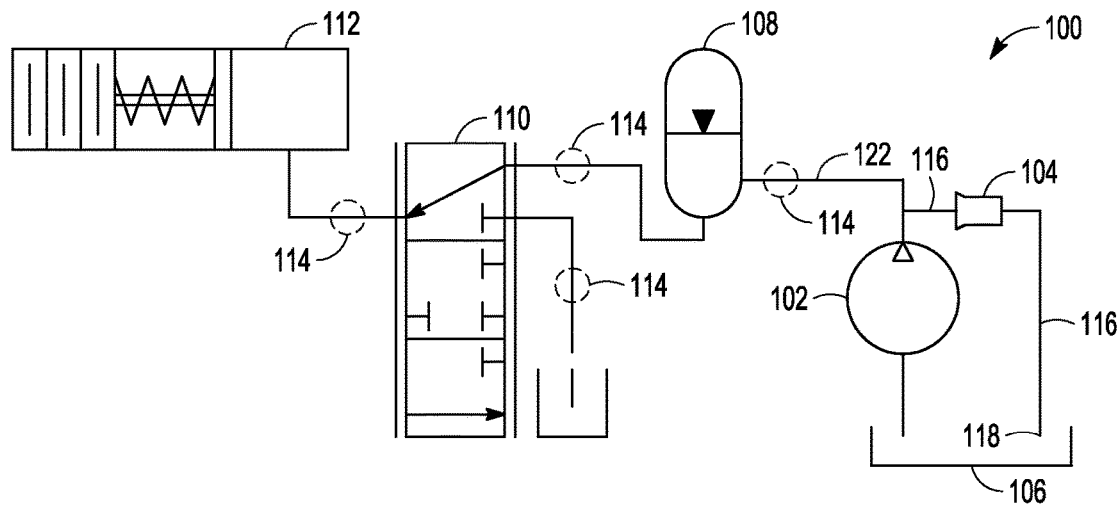
FIG. 1 is a schematic view of a fluid system having a pump with a purge valve, according to one or more embodiments.

FIG. 1 is a schematic view of a fluid system 100 showing a pump 102 and purge valve 104 configuration, according to one or more embodiments. The system 100 may include a fluid pump 102, a purge valve 104, a tank 106, an accumulator 108, a valve, a cylinder, and series of lines 114 between the several elements of the system 100. The system 100 shown is a brake system. It is to be appreciated that the pump 102 with a purge valve 104 shown may be provided in a wide variety of fluid power applications and is not limited to a brake system. However, and as mentioned in the background, one area where airlock problems with pumps exists is in pumps that are commonly called to function immediately on startup, like brake charging pumps. Accordingly, the pump with a purge valve is being described in the context of a brake system to provide context for its operation, and as such, in the illustrated embodiment, the valve is a brake valve 110 and the cylinder is a cylinder-actuated brake 112.

With continued reference to FIG. 1, the brake system may be configured for controllably engaging one or more brakes 112 to slow a work machine or vehicle down, stop the machine or vehicle, and or hold the machine or vehicle in a stationary position. The brake system may be particularly configured to do so in response to operator actuation of a foot pedal or other actuation element and/or automatically based on one or more factors. As shown in FIG. 1, in one or more embodiments, the brake system may include an accumulator 108 in high-pressure fluid communication with a brake 112 via a brake valve 110. The brake valve 110 may be actuatable by a manually actuated pedal, an electro-hydraulic control, or both.

The accumulator 108 may be configured to have high-pressure hydraulic or drivetrain fluid available to respond quickly to brake actuation. In one or more embodiments, the accumulator 108 may include a pressure storage reservoir containing incompressible hydraulic or drivetrain fluid. The accumulator 108 may also include an energy source such as a compressed gas, a spring, or a potential energy source such as a relatively heavy elevated weight, for example. In one or more embodiments, the accumulator 108 may include a hydro-pneumatic accumulator.

The brakes 112 may be configured to indirectly engage a rotating wheel (e.g., a rim/tire-type wheel, a wheel in a traction system, or another type of wheel) so as to convert kinetic energy to heat through a frictional engagement. In one or more embodiments, the brake 112 may be a disc brake, a drum brake, or another type of brake may be provided.

The brake valve 110 may be configured to provide for operator or automatic control of the fluid flow to the brake 112 to control engagement of the brake 112. The brake valve 110 may include one or more command devices such as a brake pedal and/or an electro-hydraulic control. The brake pedal, the electro-hydraulic control, or both may be coupled to one or more valve spools to selectively and controllably apply the brakes with variable pressure. The brake pedal and the electro-hydraulic control may be coupled to the brake spool or spools via actuation springs or other biasing mechanisms that establish a biasing force against the one or more valve spools when the brake pedal is pressed or when the electro-hydraulic control actuates a command.

For purposes of charging the accumulator 108 of the brake system, a fluid pump 102 may be provided. The fluid pump 102 may include a fixed or variable displacement pump depending on the nature of the system and/or related systems that may be relying on the fluid pump 102 for delivery of fluid. In one or more embodiments, the pump 102 may be a gear pump and may be a tandem hoist and brake charge pump, for example. The particular details of one example of a tandem hoist and brake charge pump with integrated purge valve are described in more detail below. For now, suffice to say that the pump 102 may provide fluid to the accumulator 108 to charge the accumulator 108. That is, fluid may be pumped to the accumulator 108, the fluid may be received by the accumulator 108, and the work being performed and pressure generated by the pump 102 may be transferred and stored by the energy storage source of the accumulator 108. For example, in the case of a compressed gas, the fluid being pumped into the accumulator 108 may compress a gas above the fluid thereby storing the energy in the form of a compressed gas. In one or more embodiments, charging of the accumulator 108 may include developing a charge pressure of up to 3000 psi, for example.

Figure 2:
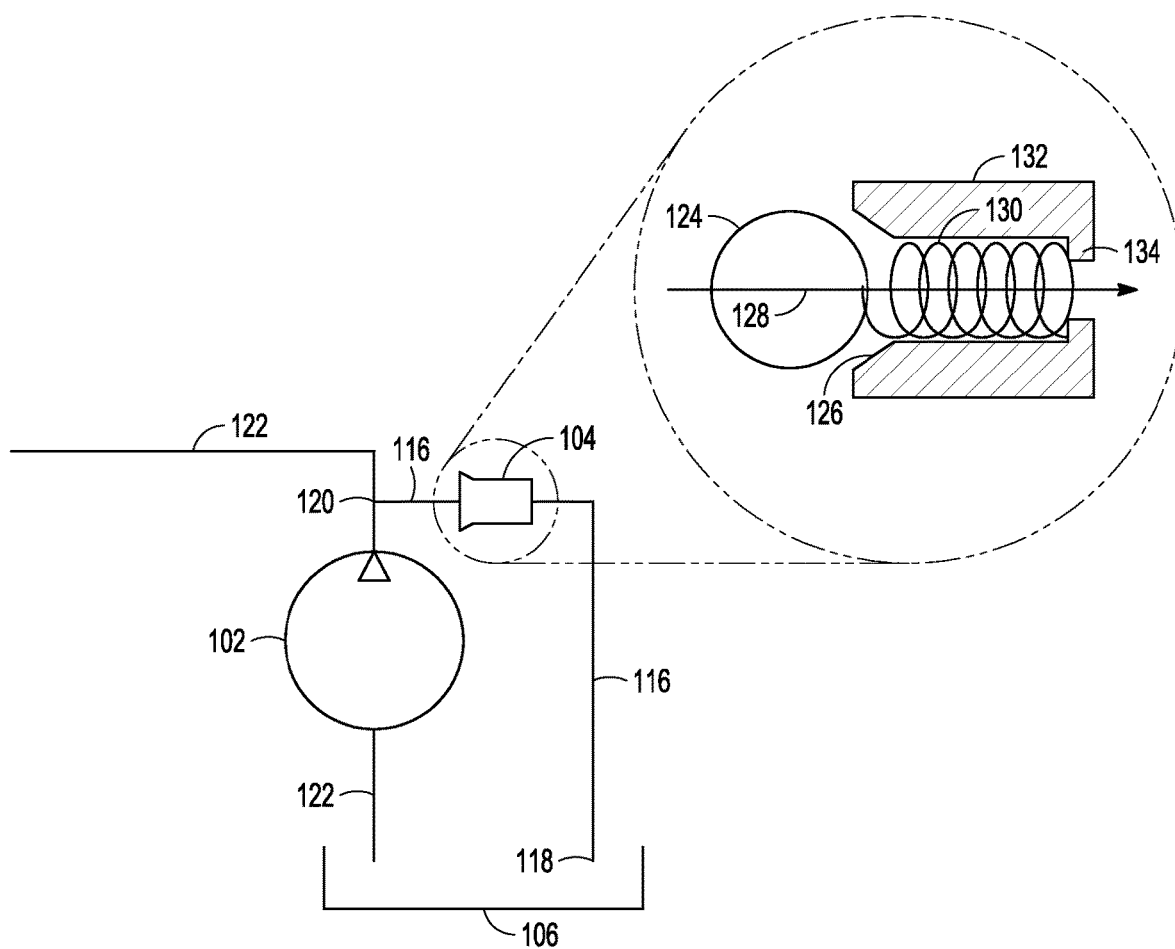
FIG. 2 is a focused view of the schematic pump with a purge valve, according to one or more embodiments.

With continued reference to FIG. 1 and the closeup view of FIG. 2, a purge valve 104 may also be provided. That is, for example, and as shown, a purge valve 104 may be provided at a point on a downstream or outlet side of the pump 102. The purge valve 104 may be configured to release air from the system at relatively low pressures and to close upon the arrival of fluid in the pump 102 and, as such, may function to remedy airlock situations and reduce damage from cavitation erosion. As shown, the purge valve 104 may include a purging fluid pathway 116 providing fluid communication between the pump 102 and a relief point 118. For example, the purging fluid pathway 116 may include a purge inlet 120 arranged downstream of the pump 102 along an operational fluid pathway 122 of the fluid system 100. The purge inlet 120 may be in fluid communication with the operational fluid pathway 122 so as to allow fluid in the operational fluid pathway 122 to flow into and through the purging fluid pathway 116. The purging fluid pathway 116 may extend from the purge inlet 120 to a relief point 118 such as a tank or reservoir 106. In other embodiments, the purging fluid pathway 116 may extend to another location on the hydraulic or fluid system. For example, some pumps in the system may not commonly have airlock problems due to the nature of their operation, the timing of their operation, their position in the system (e.g., where gravity helps feed fluid), or other factors. In these circumstances, the purging fluid pathway 116 may extend from the purge inlet 120 to a relief point 118 such as the inlet of these other pumps in the system, for example. Still other locations in the hydraulic or fluid system that have sufficiently low pressures may be used as a relief point 118 and nearby locations may be selected if reduced hose lengths, for example, are desired. In any case, a purge valve 104 may be provided along the purging fluid pathway 116 between the purge inlet 120 and the relief point 118, where the flow direction is defined to flow from the pump 102 to the purge inlet 120 and further to the relief point 118. The purge valve 104 may be adapted to maintain an open condition unless/until a suitable working fluid arrives in or is output/driven by the pump 102. It is to be appreciated that the purging fluid pathway 116 may be in addition to the operational fluid pathway 122 of the working hydraulic or drivetrain fluid the pump is designed to drive for performing operations of the equipment. The valve 104 may be adapted to provide flow through the purging fluid pathway 116 unless/until sufficient pressure develops within the pump 102 whereafter suitable working fluid flow may be provided through the operational fluid pathway 122.

As shown in FIG. 2, in one or more embodiments, the purge valve 104 may be a spring open check valve. For example, the check valve may include a ball, valve disk, or other moveable part 124. The moveable part 124 may be positioned near, but offset from, a sealing seat 126 and configured for reciprocating between an open position where the moveable part 124 is spaced apart from the sealing seat 126 and a closed position where the moveable part 124 is engaged with the sealing seat 126. The moveable part 124 may be biased in a direction opposite the flow direction 128 and in the open position by a biasing mechanism 130 such as a spring, for example. In one or more embodiments, the purge valve 104 may include a cylindrical housing, cartridge, or other surrounding structure 132 having a longitudinal axis arranged along the flow direction 128 and having an inward extending annular rib 134 at a downstream end supporting the spring and the sealing seat 126 may be arranged on the upstream end. The sealing seat 126 may be adapted to engage with the moveable part 124 and, for example, may include a cone-shaped annular seat for receiving the moveable part 124 in the closed position. The spring may be arranged within the cylinder or surrounding structure 132, may rest on the annular rib 134, and may extend through the surrounding structure 132 and beyond the seat 126 when the spring is in a relaxed, fully extended, condition. The spring or other biasing mechanism 130 may have a relatively low spring constant such that the purge valve 104 is maintained in an open position when little to no hydraulic fluid-induced pressure is applied to the moveable part 124, but is quickly and easily closed when such pressure is applied to the moveable part 124. For example, when a pump is airlocked it may displace fluid in the form of air or a mixture of air and hydraulic or drivetrain fluid where the ratio of air to hydraulic or drivetrain fluid remains quite high. In either case, a relatively low pressure may be generated by the pump that fluidly engages an upstream side of the moveable part 124. The relatively low pressure may range from 0-50 psi, or from 10-45 psi, or from 25-40 psi, or the relatively low pressure may be approximately 35 psi. The surface area of the moveable part 124 on which the pressure may act and the resistance or spring constant of the biasing mechanism 130 may be selected to remain open under these types of pressures. As such, under these low pressures, the pump 102 may function to eject air from the pump 102 out of the purge valve 104. However, as the air is ejected from the system and is replaced by an increasing volume of substantially air-free fluid, higher pressures may develop. Once such resultant pressures develop and exceed a triggering pressure, the moveable part 124 may be forced by pressure from the working fluid against the biasing force of the biasing mechanism 130 until the moveable part 124 is seated against the seat 126 to create a seal. Thereafter, fluid flow around the moveable part 124 and through the purge valve 104 is interrupted, arrested, and/or stopped. The triggering pressure may range from approximately 5 psi to approximately 100 psi, or from approximately 20 psi to approximately 50 psi, or from approximately 30 psi to approximately 40 psi, or a triggering pressure of approximately 35 psi may be provided and may correspond to a substantially air-free operational state of the pump 102. The triggering pressure may be selected and determined based on the stiffness of the biasing mechanism 130 and the surface area of the moveable part 124, for example. The purge valve 104 may be suitable for use on or in conjunction with (e.g., in fluid communication with) a wide variety of pumps to remedy airlock problems in the pumps and reduce damage from cavitation erosion.

Figure 3:
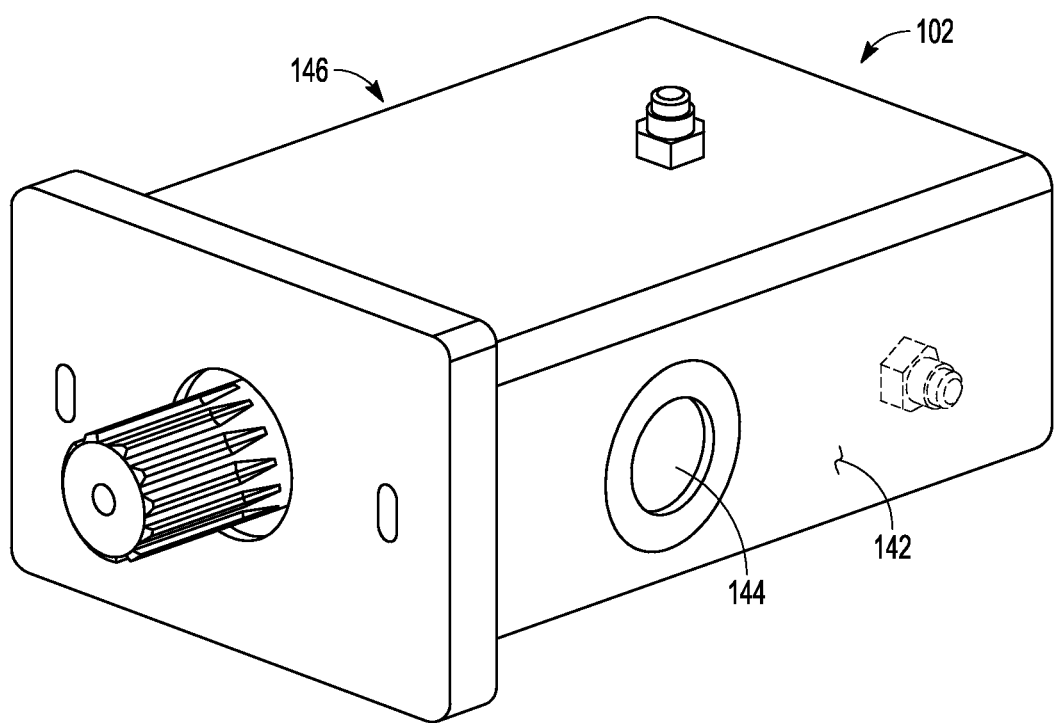
FIG. 3 is a perspective view of a pump and purge valve configuration where the purge valve is integrated into the pump, according to one or more embodiments.
Figure 4:
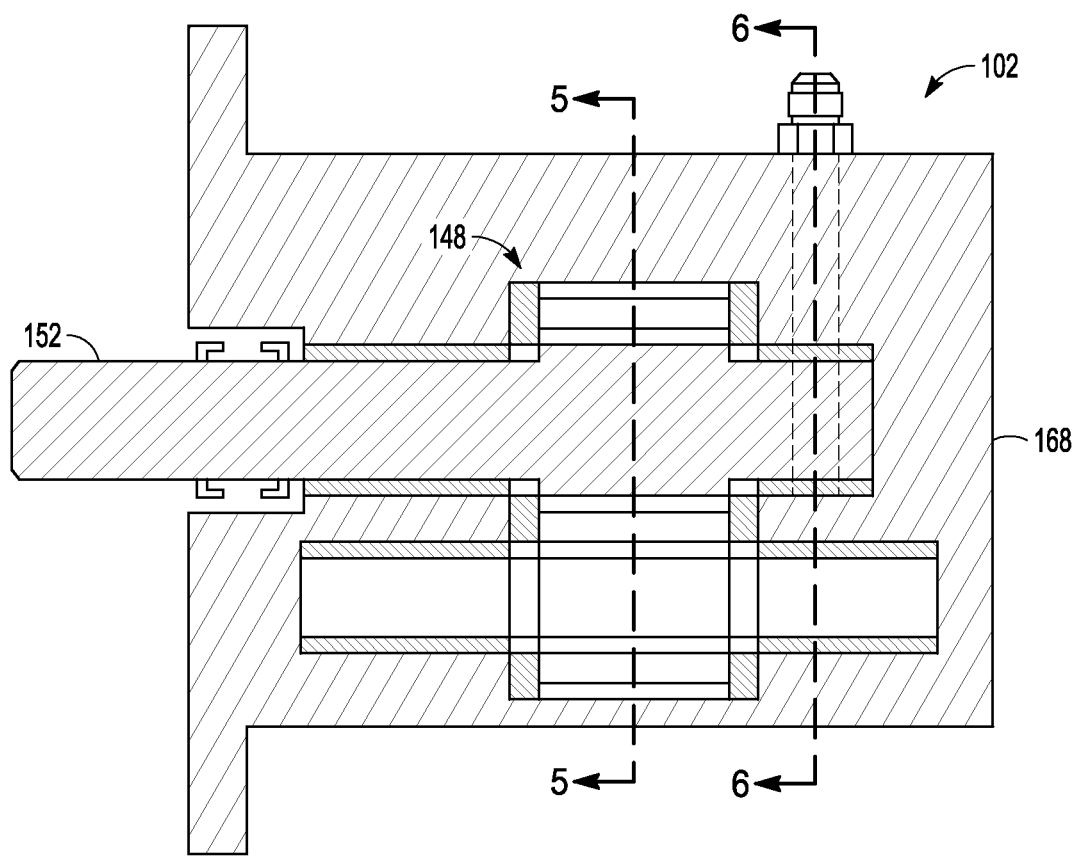
FIG. 4 is a longitudinal cross-sectional view thereof.

Turning now to FIGS. 3-15 the mentioned pump and purge valve configuration may be implemented in several ways. That is, for example, as shown in FIGS. 3-7, a purge valve may be integrated into a single pump. In other embodiments as shown in FIGS. 8-14, the purge valve may be integrated into a tandem pump such as a tandem hoist and brake charge pump. Still further, as shown in FIGS. 15, the purge valve may be arranged outside of the pump such as through the use of a downstream manifold or diverter, for example. Starting with FIG. 3 and continuing the discussion of FIGS. 1 and 2, a more detailed discussion of the pump 102 and purge valve 104 configuration may be provided. As shown, the pump 102 may include a housing 142 with an inlet 144 and an outlet 146 and an internal pump mechanism 148 adapted to receive and draw fluid into the inlet 144 and force the fluid out of the outlet 146. The pump 102 may include a drive shaft 152 adapted to be mechanically coupled to an engine, a motor or other device for providing rotational power. As shown in FIG. 4, the driveshaft 152 may extend from outside the housing 142 of the pump 102, through a seal, and into the pump 102. The driveshaft 152 may extend through the pump 102 and may form a part of and/or be mechanically coupled to the internal pump mechanism 148 such as a pair of intermeshing or interlocking gears within the pump 102 where rotation of the driveshaft 152 drives the pair of intermeshing or interlocking gears (via e.g., the rotor or drive gear thereof) within the pump 102. The driveshaft 152 may extend past the pair of intermeshing or interlocking gears to a rear end and be seated in a socket.

Figure 5:
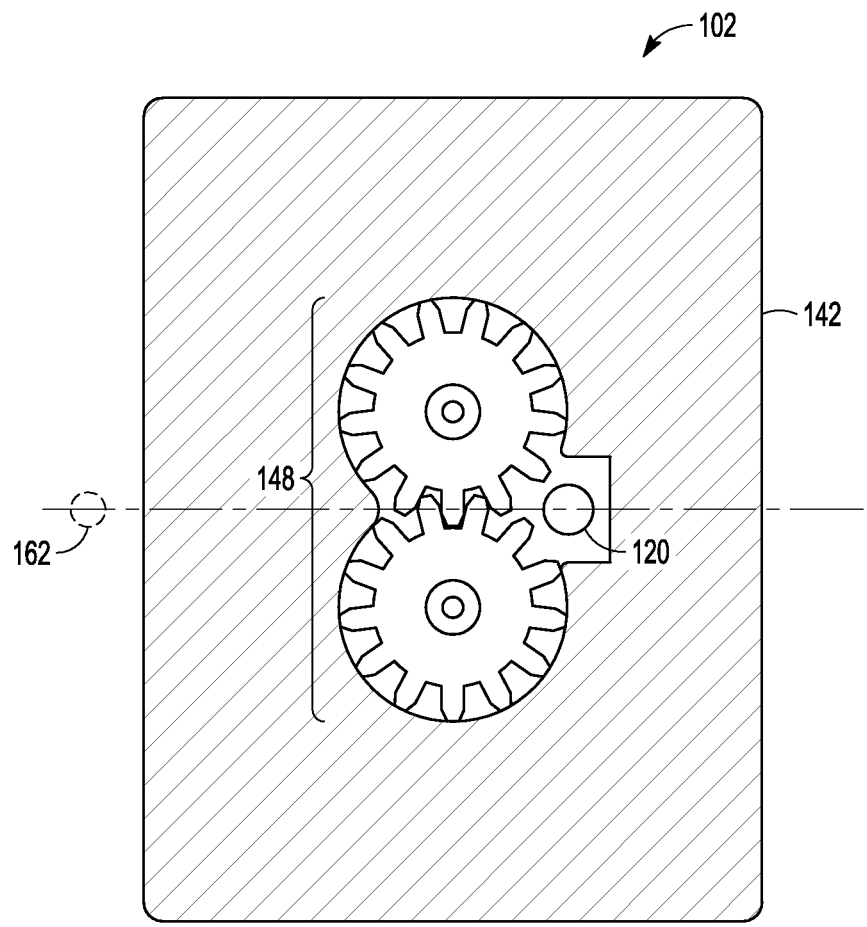
FIG. 5 is a lateral cross-sectional view thereof taken through the pump mechanism, according to one or more embodiments.
Figure 6:
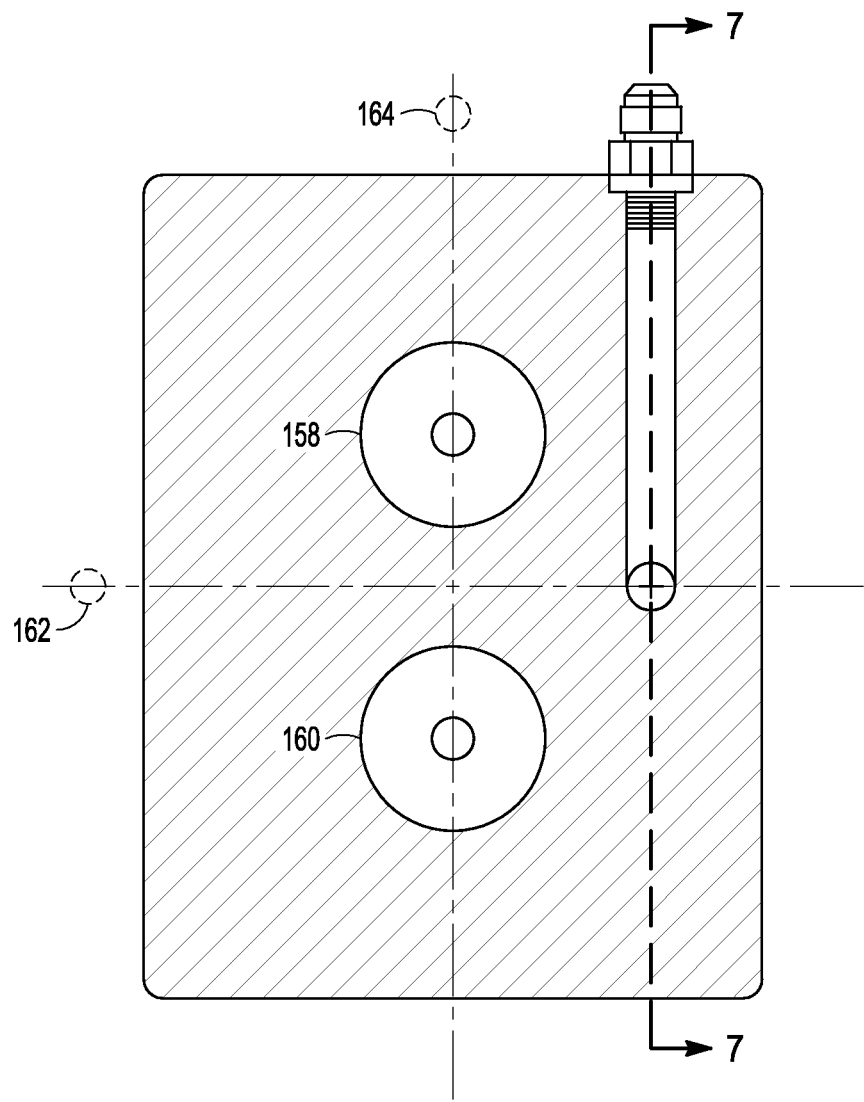
FIG. 6 is another lateral cross-sectional view thereof taken through the outlet passage, according to one or more embodiments.
Figure 7:
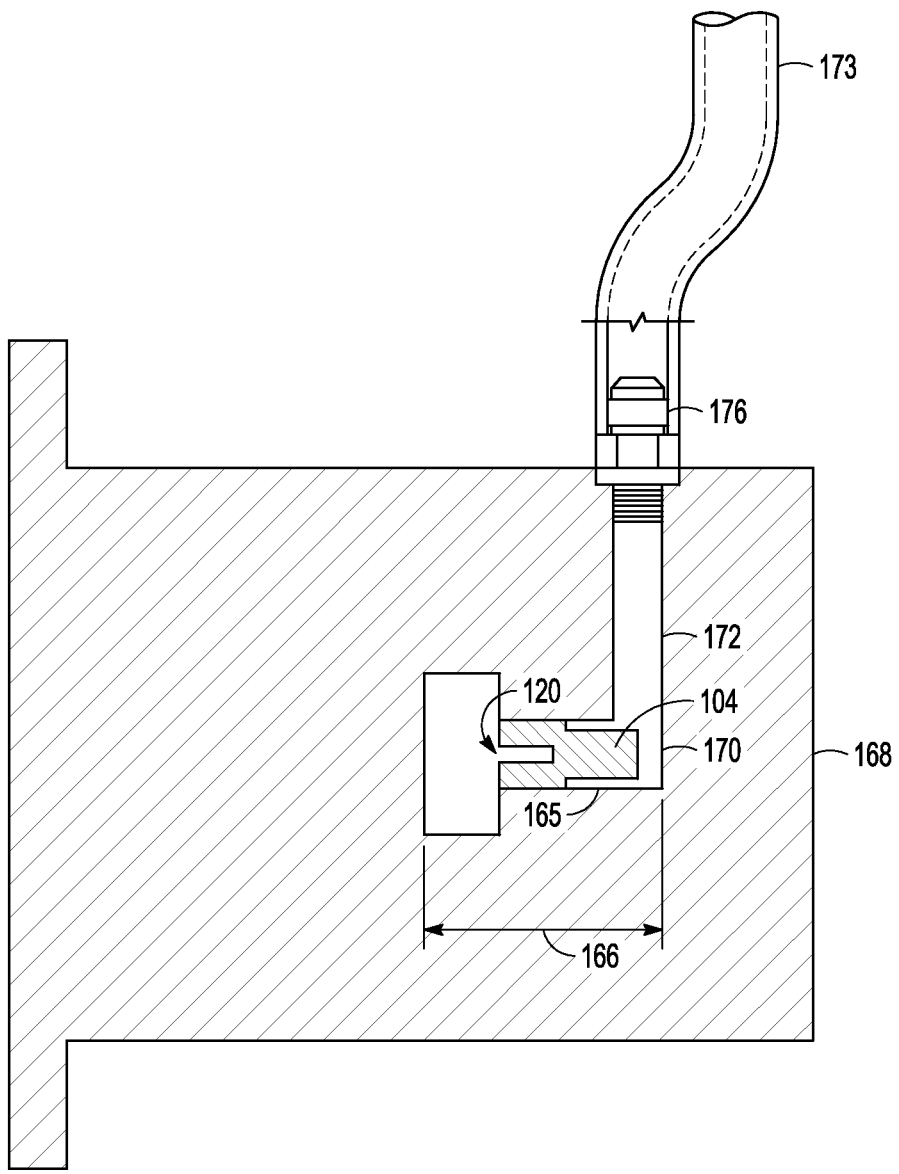
FIG. 7 is an additional longitudinal cross-sectional view thereof taken through the transition passage and outlet passage, according to one or more embodiments.
Figure 8:
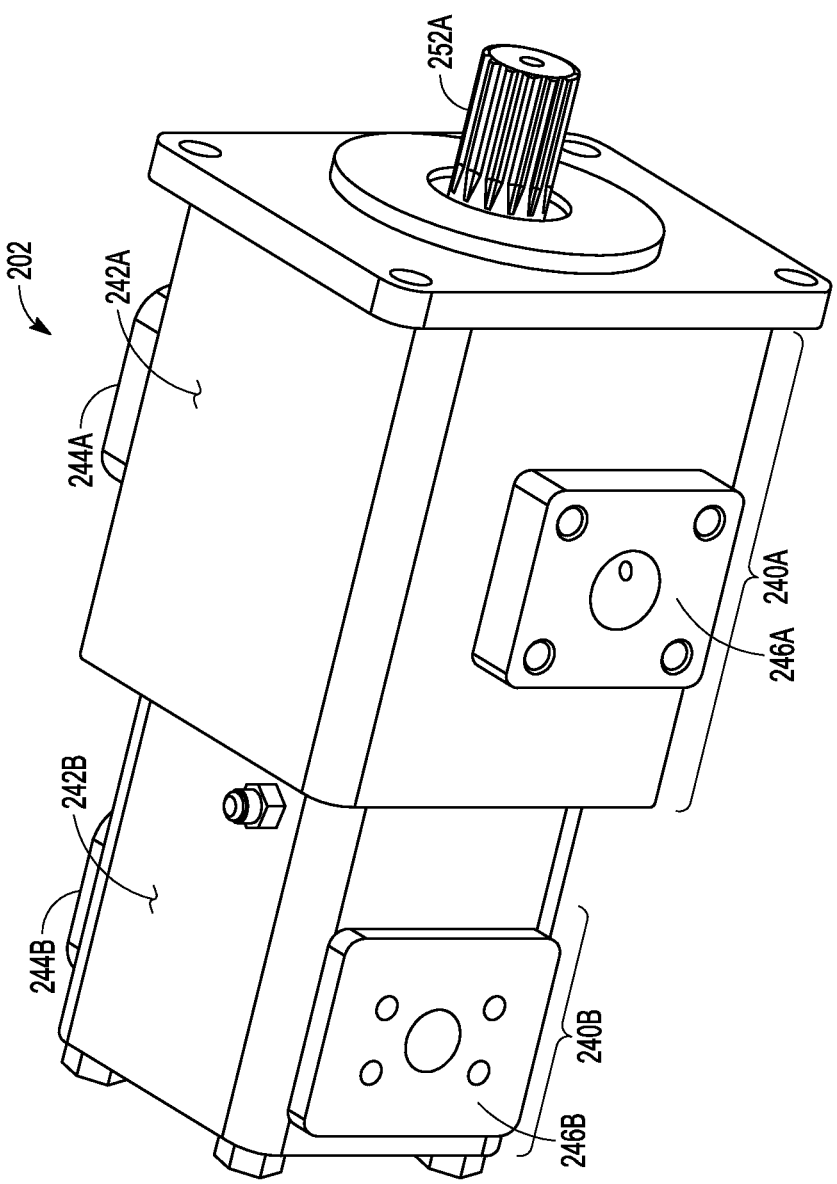
FIG. 8 is a perspective view of a pump and purge valve configuration where the purge valve is integrated into a tandem pump, according to one or more embodiments.
Figure 9:
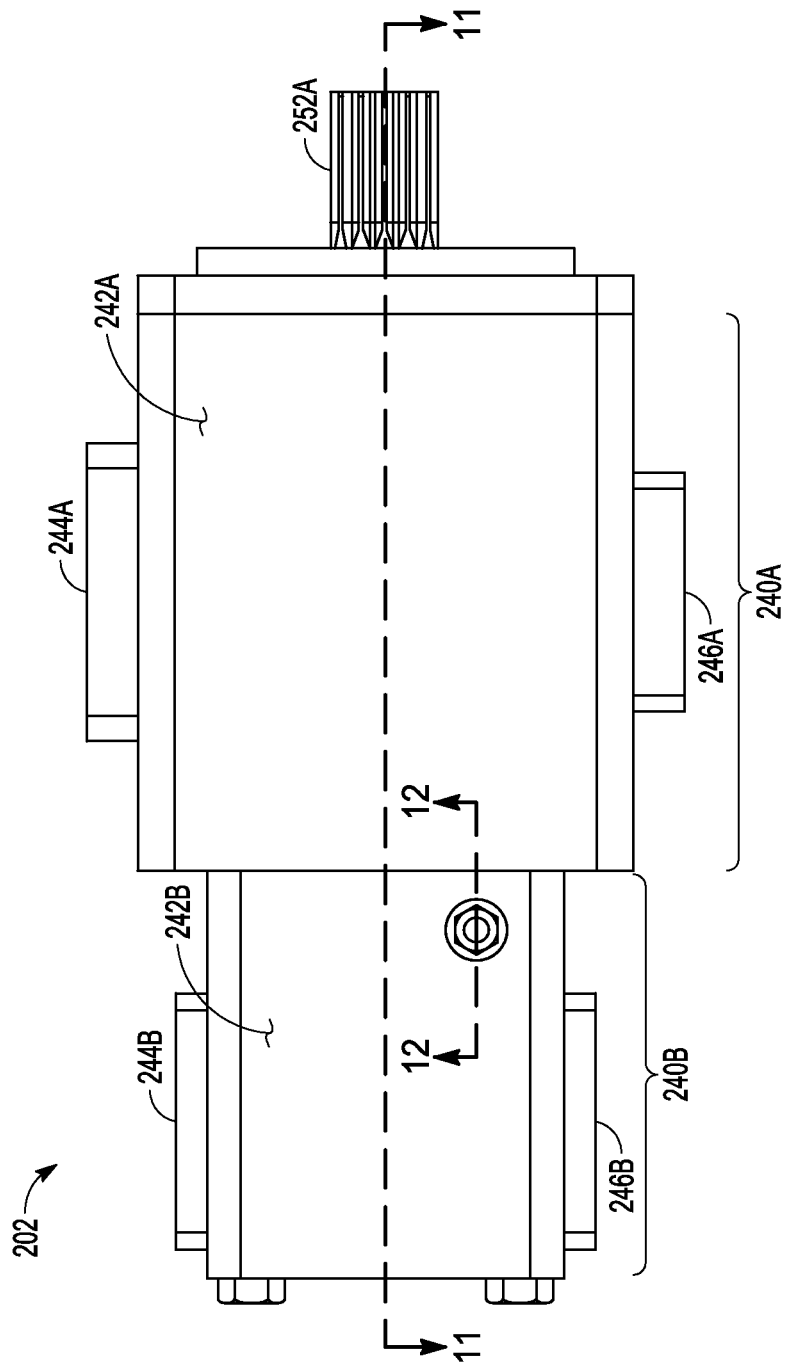
FIG. 9 is a top view thereof.
Figure 10:
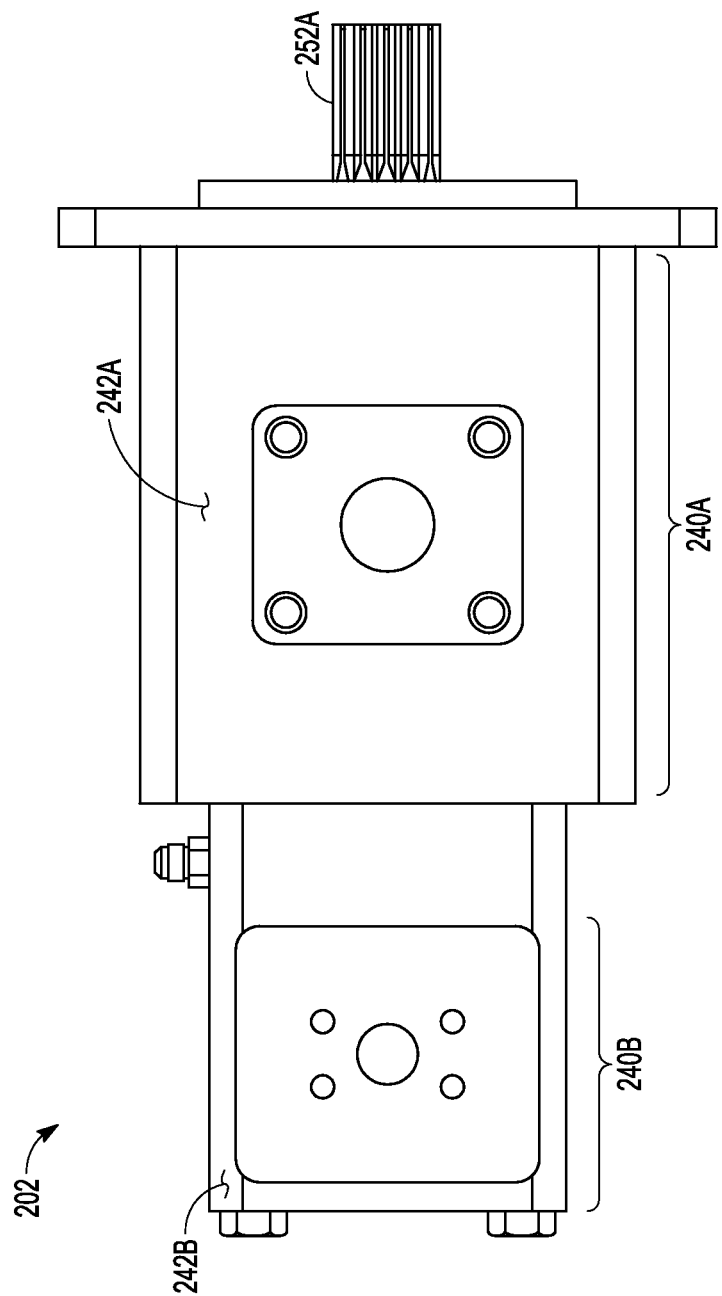
FIG. 10 is a side view thereof.

In one or more embodiments, all or a portion of a purging fluid pathway 116 may be integrated into the pump housing 142 as depicted in FIGS. 4-7. In particular, in one embodiment, the purging fluid pathway 116 may be defined as an initial, internal segment of the purging fluid pathway 116 as disclosed above and illustrated in FIGS. 1 and 2. As shown in FIG. 5, the pump housing 142 may include a purge inlet 120 in the form of an opening adjacent to the pump outlet or otherwise positioned to receive an outlet flow produced by the pumping mechanism of the pump. The purge inlet 120 may be generally arranged at a mid-height of the pump housing 142 along a reference line 162. As shown in FIG. 5, the reference line may extend generally horizontally across the pump housing 142 between the upper and lower socket bores 158/160. The purge inlet 120 may be offset from a vertically extending centerline 164 of the pump housing 142. Still further, the purge inlet 120 may be arranged on a downstream side of the pump housing 142 positioned to receive or otherwise be engaged by a downstream flow of fluid displaced by pumping mechanism 148 of the pump 102. The purge inlet 120 may be formed by an opening as discussed above, and, as such, may be located at, or may define, a beginning point or inlet of a purging fluid pathway 116. That is, as shown in FIG. 7, a valve bore 165 may extend generally horizontally into the pump housing 142 from the purge inlet 120 along a longitudinal or horizontal distance 166 and disposed entirely within the interior of the pump housing 142 without extending to form an opening in the backside 168 thereof. That is, the valve bore 165 may stop short of the backside 168 pump housing 142 at an internal, transverse transition passage 170, which may be generally L-shaped, forming a fluid connection with and providing pathway access to an outlet passage 172. The outlet passage 172 may extend outward from the transition passage 170 within the interior of the pump housing 142 to an outer end which may define a passage opening or outlet formed in the outer surface of the pump housing 142 to form an opening therein. Both the valve bore 165 and the outlet passage 172 may include internal surface features adapted to receive and secure fittings. For example, the valve bore 165 may have internal surface features for receiving and retaining a purge valve 104 such as a check valve or a spring-open check valve, which, in one example, may be embodied as, or may be equivalent to, purge valve 104 as described above and illustrated in FIG. 2. The outlet passage 172 may include internal surface features for receiving and retaining a nipple, hose barb, hose fitting, or other port or connection element 176 (see FIG. 7).

Referring now to FIG. 5, a cross-sectional view of the pump housing 142 with the pumping mechanism 148 in the form of a gear pump is shown. As shown, the opening may be arranged on a downstream side of the pump housing 142 generally along a line 162 extending between the two gears of the pump. As air is moved by the gears it may find resistance downstream of the pump where the line may contain fluid, for example. As such, the air may naturally find its way toward and into the valve bore 165, which may have a purge valve 104 such as a spring-open check valve arranged therein, which, in one example, may be embodied as, or may be equivalent to, purge valve 104 as described above and illustrated in FIG. 2. The purge valve 104 may be in a naturally open condition unless/until pressures develop that will close the valve. As shown in FIGS. 4-7, the air may be free to pass into and through the valve bore 165 and purge valve 104 disposed therein and outward through the outlet passage 172. As shown in FIG. 7, the outlet or opening of the outlet passage 172 formed in the outer surface of the pump housing 142 may include a nipple, hose barb, hose fitting, or other port or connection element 176 configured to attach a hose or other hydraulic conduit 173 in fluid communication with outlet passage 172 such that the ejected air may be carried to an appropriate relief point.

It is to be appreciated that while the purging fluid pathway 16 is shown to exit the housing of the pump 102 on the top, other exit locations may also be provided. For example, as shown in FIG. 3, a side exit may be provided. A bottom, back, or other side exit may also be provided. Still other locations may be provided so long as the purging fluid pathway can be routed to that location.

Figure 11:
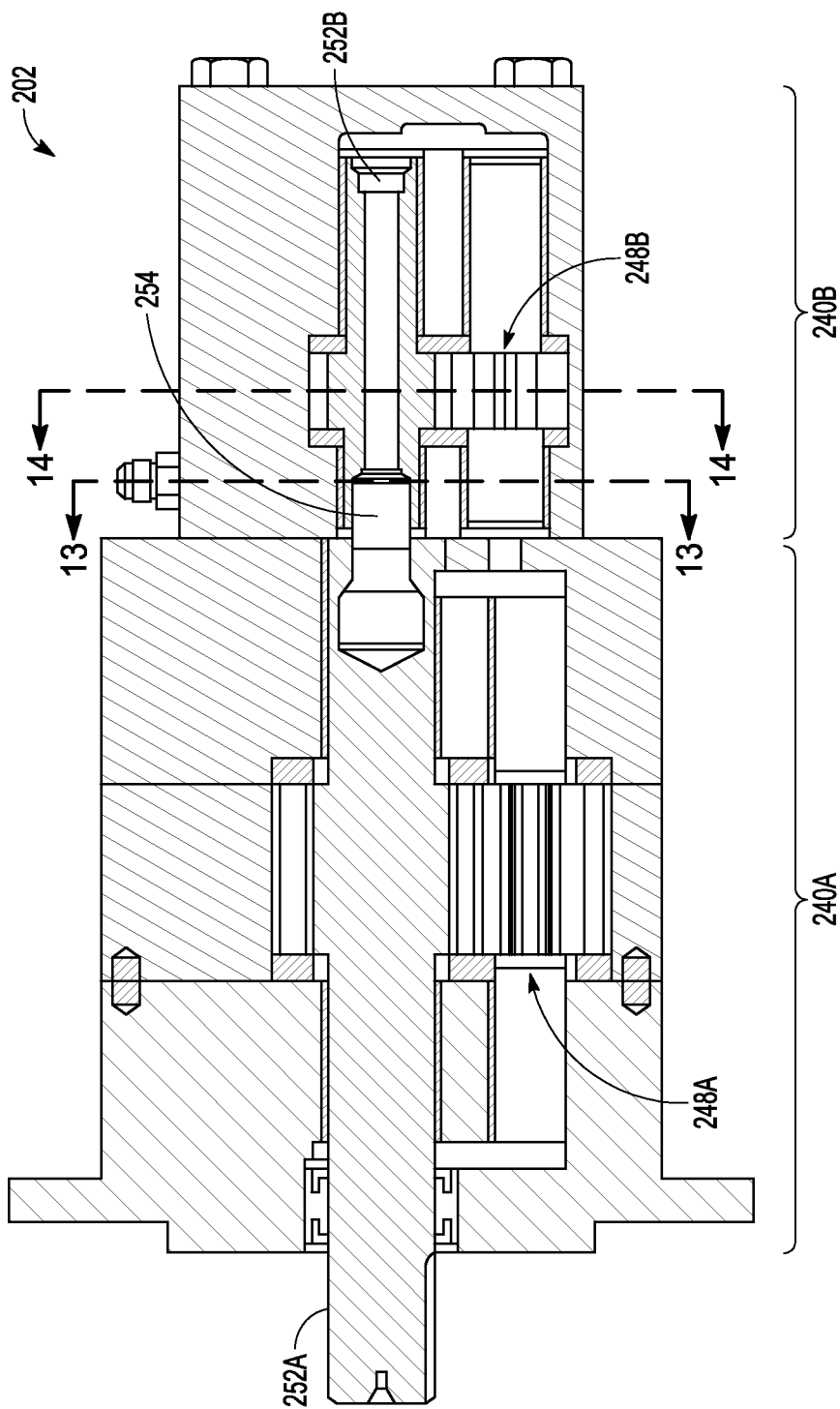
FIG. 11 is a longitudinal cross-section thereof.
Figure 12:
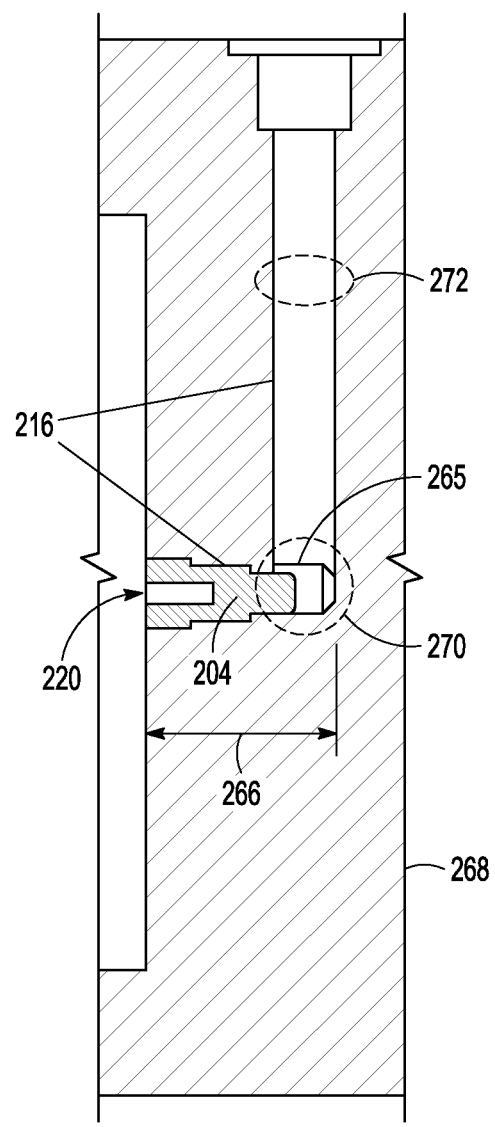
FIG. 12 is a partial longitudinal cross-section thereof.
Figure 13:
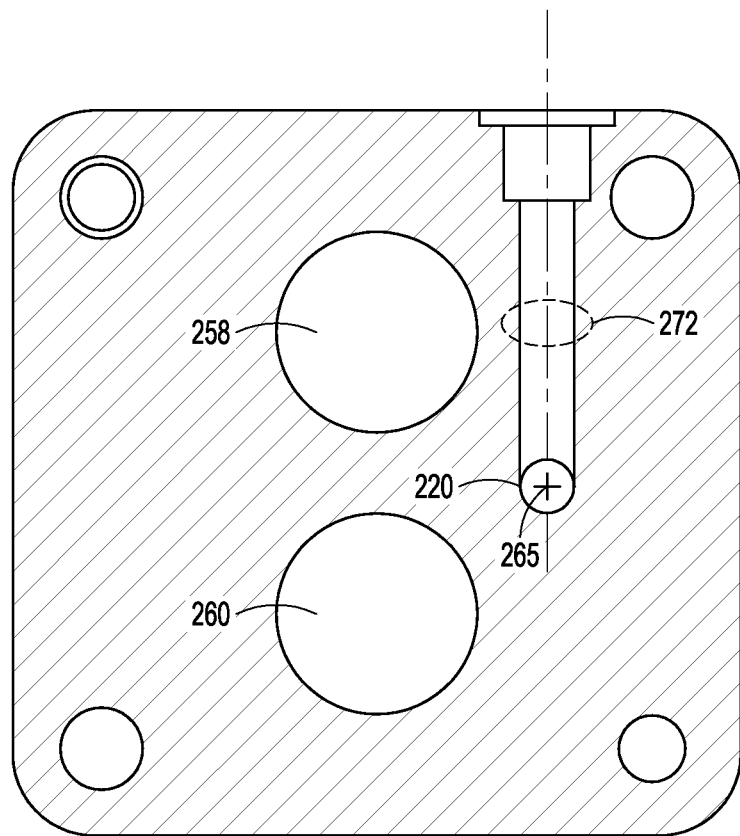
FIG. 13 is a lateral cross-section thereof taken through the outlet passage.
Figure 14:
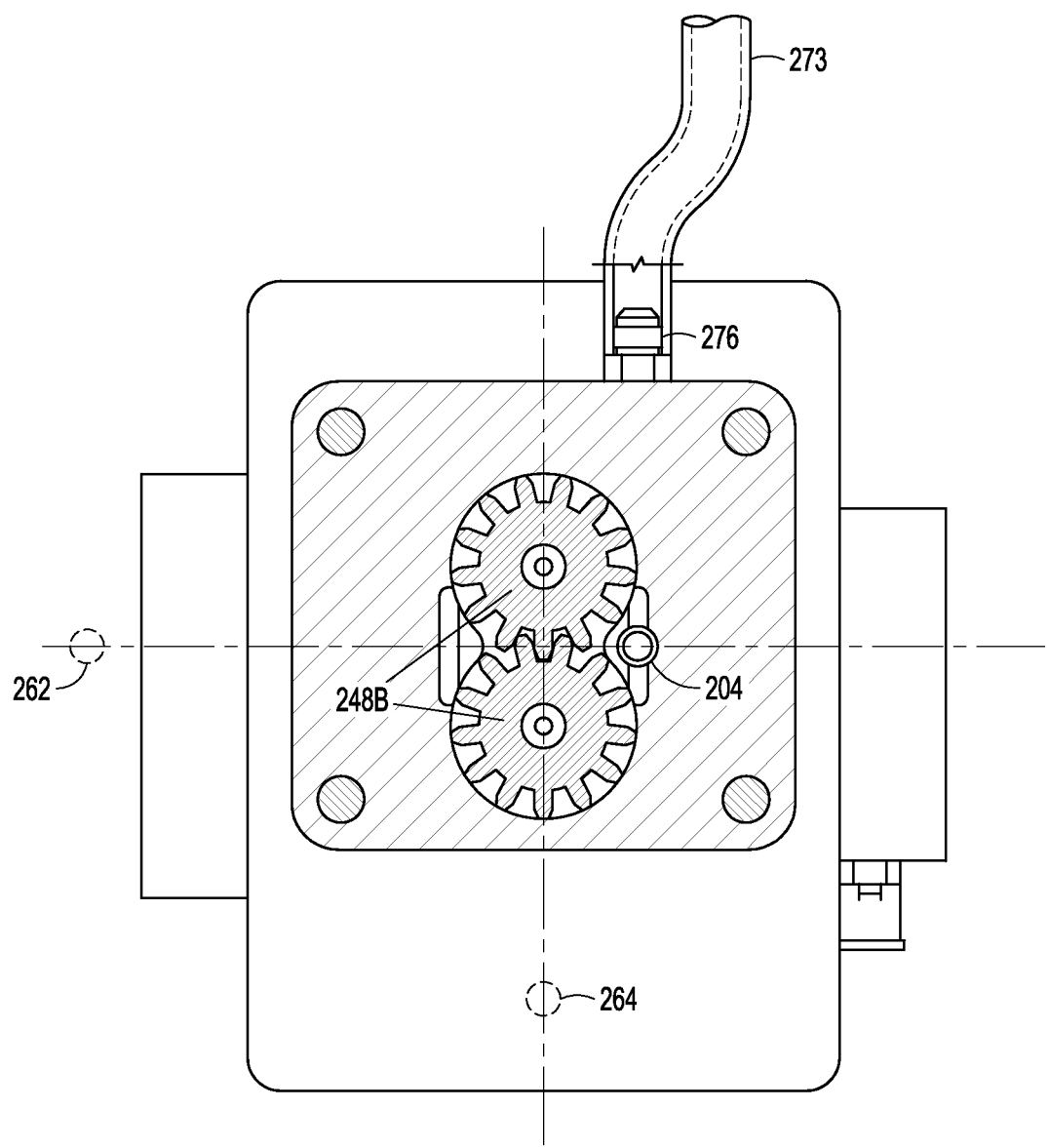
FIG. 14 is a lateral cross-section thereof taken through the pump mechanism.
Figure 15:
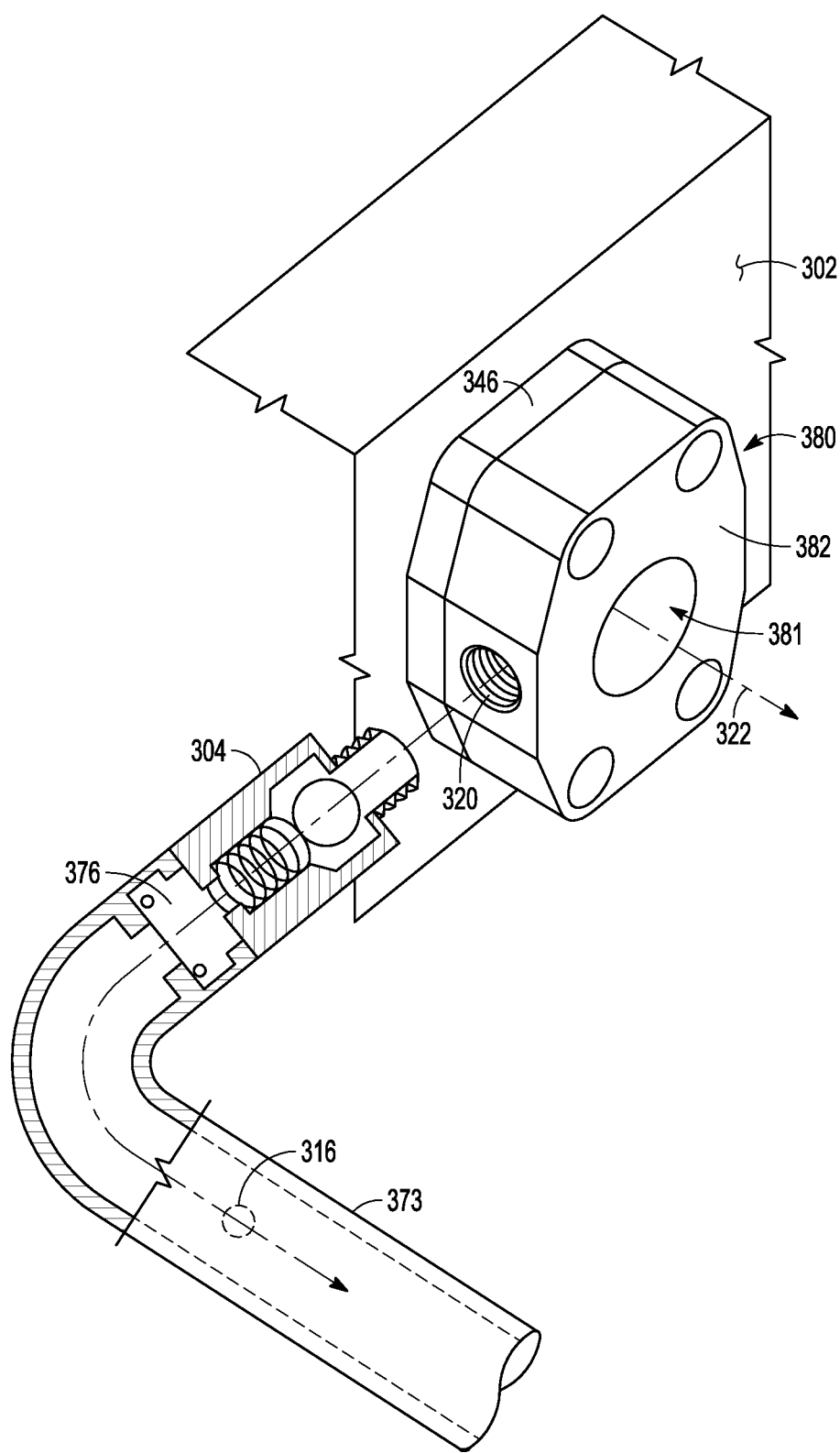
FIG. 15 is a perspective view of a pump and purge valve configuration where the purge valve is outside of the pump housing, according to one or more embodiments.

Turning now to FIGS. 8-14, another type of implementation of a pump and purge valve configuration may be described. FIGS. 8-11 show a tandem hoist and brake charge pump 202. The tandem pump 202 may include a first pump 240A and a second pump 240B where the first pump 240A is in fluid communication with a hoist system, such as a hoist for tipping a truck bed of a work truck, for example. The second pump 240B may be in fluid communication with a brake system such as the brake system described with respect to FIGS. 1 and 2. Each pump may include a housing 242A/B with an inlet 244A/B and an outlet 246A/B and an internal pump mechanism 248A/B adapted to receive and draw fluid into the inlet 244A/B and force the fluid out of the outlet 246A/B. The first pump 240A of the pump 202 may include a drive shaft 252A adapted to be mechanically coupled to an engine, a motor or other device for providing rotational power. As shown in FIG. 11, the driveshaft 252A may extend from outside the housing 242A of the first pump 240A, through a seal, and into the first pump 240A of the tandem pump 202. The driveshaft 252A may extend through the first pump 240A of the tandem pump 202 and be mechanically coupled to a pump mechanism 248A such as a pair of intermeshing or interlocking gears within the first pump 240A where rotation of the driveshaft 252A drives the pair of intermeshing or interlocking gears (via e.g., the rotor or drive gear thereof) within the first pump 240A. The driveshaft 252A may extend to a side of the first pump 240A opposite the seal and may be mechanically coupled to a connecting shaft 254. The connecting shaft 254 may extend out the end of the first pump 240A and into the second pump 240B. Like the first pump 240A, the second pump 240B may include a driveshaft 252B that extends from outside the housing 242B of the second pump 240B, through a seal, and into the second pump 240B of the tandem pump 202. The driveshaft 252B may extend through the second pump 240B of the tandem pump 202 and be mechanically coupled to a pump mechanism 248B such as a pair or intermeshing or interlocking gears within the second pump 240B where rotation of the driveshaft 252B drives the intermeshing or interlocking gears (via e.g., the rotor or drive gear thereof) in the second pump 240B. For purposes of discussion, the series of driveshafts 252A/B, the connecting shaft 254, and/or the power system may be referred to as a drivetrain that powers one or more tandem pumps 202 or pumps 240A/B within the tandem pump 202. As shown by comparing FIG. 8 with FIGS. 9-11, the internal pumping mechanisms 248A/B driven by the driveshafts 252A/B may be arranged in line with and in between respective inlets 244A/B and the outlets 246A/B so as to receive fluid from one side and eject fluid out the opposite side of the pump 202 through respective outlets. As discussed above, pumping mechanisms 248A/B of each pump of the tandem pump may each include a pair of intermeshing or interlocking gears as shown in FIG. 14. Each pair of gears may be arranged on respective shafts, one of which may be the drive shaft of each respective pump 240A/B.

In one or more embodiments, all or a portion of a purging fluid pathway 216 may be integrated into the pump housing 242B as depicted in FIGS. 12-14. In particular, in one embodiment, the purging fluid pathway 216 may be defined as an initial, internal segment of the purging fluid pathway 116 as disclosed above and illustrated in FIGS. 1 and 2. As shown, the pump housing 242B may include a purge inlet 220 in the form of an opening adjacent to the pump outlet or otherwise positioned to receive an outlet flow produced by the pumping mechanism of the pump. Further, the purge inlet 220 may correspond to the purge inlet 120 discussed above and shown in FIGS. 1 and 2. The purge inlet 220 may be generally arranged at a mid-height of the pump housing 242B or along a reference line 262, as shown in FIG. 14, extending generally horizontally across the pump housing 242B between the upper and lower bores 258/260. The purge inlet 220 may be offset from a vertically extending centerline 264 of the pump housing 242B. Still further, the purge inlet may be arranged on a downstream side of the pump housing 242B positioned to receive or otherwise be engaged by a downstream flow of fluid displaced by pumping mechanism 248A/B of each pump of the tandem pump 202. The purge inlet 220 may be formed by an opening as discussed above, and, as such, may be located at, or may define, a beginning point or inlet of a purging fluid pathway 216. That is, as shown in FIG. 12, a valve bore 265 may extend generally horizontally into the pump housing 242B from the purge inlet 220 along a longitudinal or horizontal distance 266 and disposed entirely within the interior of the pump housing 242B without extending to form an opening in the frontside 268 thereof. That is, the valve bore 265 may stop short of the frontside 268 pump housing 242B at an internal, transverse transition passage 270, which may be generally L-shaped, forming a fluid connection with and providing pathway access to an outlet passage 272. The outlet passage 272 may extend outward from the transition passage 270 within the interior of the pump housing 242B to an outer end which may define a passage opening or outlet formed in the outer surface of the pump housing 242B to form an opening therein. Both the valve bore 265 and the outlet passage 272 may include internal surface features adapted to receive and secure fittings. For example, the valve bore 265 may have internal surface features for receiving and retaining a purge valve 204 such as a check valve or a spring-open check valve, which, in one example, may be embodied as, or may be equivalent to, purge valve 104 as described above and illustrated in FIG. 2. The outlet passage 272 may include internal surface features for receiving and retaining a nipple, hose barb, hose fitting, or other port or connection element 276 (see FIG. 14).

Referring now to FIG. 14, a cross-sectional view of the pump housing 242B with the pumping mechanism 248B in the form of a gear pump is shown. As shown, the opening may be arranged on a downstream side of the pump housing 242B generally along a line 262 extending between the two gears of the pump. As air is moved by the gears it may find resistance downstream of the pump where the line may contain fluid, for example. As such, the air may naturally find its way toward and into the valve bore 265, which may have a purge valve 204 such as a spring-open check valve arranged therein, which, in one example, may be embodied as, or may be equivalent to, purge valve 104 as described above and illustrated in FIG. 2. The purge valve 204 may be in a naturally open condition unless/until pressures develop that will close the valve. As shown in FIGS. 12-14, the air may be free to pass into and through the valve bore 265 and purge valve 204 disposed therein and outward through the outlet passage 272. As shown in FIG. 14, the outlet or opening of the outlet passage 272 formed in the outer surface of the pump housing 242B may include a nipple, hose barb, hose fitting, or other port or connection element 276 configured to attach a hose or other hydraulic conduit 273 in fluid communication with outlet passage 272 such that the ejected air may be carried to an appropriate relief point.

It is to be appreciated that while the purging fluid pathway 216 is shown to exit the housing of the pump 202 on the top, other exit locations may also be provided. For example, similar to that shown in FIG. 3, a side exit may be provided. A bottom, back, or other side exit may also be provided. Still other locations may be provided so long as the purging fluid pathway can be routed to that location.

It is to be appreciated that while the purge valve 104/204 in the described implementations has been shown immediately adjacent to the internal gear cavity of the pump, the valve 104/204 may be arranged at most any point downstream of the pump and along the purging fluid pathway 116/216 between the pump 102/202 and the relief point 118/218. That is, the valve position might not be integrated into the pump housing 142/242A/B and may be along a hose or other fixture or element of the purging fluid pathway 116/216 such as, for example, an external manifold. In one or more embodiments, positioning the valve outside the pump 102/202 may provide for more readily replacing the valve 104/204 or retrofitting existing machines. In one or more embodiments, the valve 104/204 may be incorporated into a fluid line and replacement of the fluid line with another fluid line having a valve therein may be one approach to replacement of the valve 104/204.

For example, and as shown in FIG. 15, an external manifold 380 may be provided for attachment to an outlet 346 of a pump 302. The external manifold 380 may be configured to provide a location along the operational fluid pathway 322 and downstream of the outlet 346 for placement of the inlet 320 to the purging fluid pathway 316. In one or more embodiments, as shown, the manifold 380 may include a conduit, shell, housing, or other containment element 382 defining a chamber or other downstream zone 381 in fluid communication with the outlet 346 of the pump 302. The containment element 382 may be arranged downstream of a pump outlet 346 and may be secured to the outlet 346 of a pump 302 with one or more fasteners that extend fully through the manifold and into the pump. Where a larger manifold is provided, an upstream and downstream flange or other securing mechanism may be provided for securing the manifold to the pump and to adjoining plumbing, for example. That is, a securing mechanism arranged on an upstream side of the containment element 382 may replicate the attachment of the downstream plumbing that is otherwise commonly attached to the outlet side of the pump 302 and a securing mechanism on a downstream end of the containment element 382 may replicate the attachment features on the outlet 346 of the pump such that plumbing that would otherwise be connected directly to the pump 302 may be connected to the downstream end of the manifold 380.

As mentioned, the manifold 380 may also define an inlet 320 to the purging fluid pathway 316 that is in fluid communication with the chamber 381. In one or more embodiments, as shown in FIG. 15, the inlet 320 may include a threaded bore for securing a fitting. Alternatively, a protruding connection such as a hose barb or hose fitting may be provided. In one or more embodiments, the purge valve 304 may be adapted for insertion into the inlet 320 and may have a hose barb, nipple, hose fitting, or other port or connection element 376 for connection of a hose or other hydraulic conduit 373 such that air may be carried to an appropriate relief point. The purge valve 304 may be the same or similar to the purge valves 104/204. Alternatively, the purge valve 304 may be arranged in the hose or other hydraulic conduit 373 allowing for relative ease in replacing the purge valve 304. For example, rather than having a threaded end and a opposite hose barb end, the valve 304 may have hose barbs or other line-connecting elements on each end. Moreover, while a plate-like manifold is shown, still other laterally extending chambers or other shaped manifolds may be provided.

It is to be further appreciated that while the details of an overall fluid system and the details of the purge valve 204/304 may not have been discussed with respect to the embodiment of FIGS. 8-15, the system and valve 204/304 may have the same or similar features as the purge valve 104 described with respect to FIGS. 1-7. Moreover, where a feature or element is not discussed with respect to a particular embodiment it should be appreciated that such a feature described with respect to another embodiment may be included in the embodiment.

INDUSTRIAL APPLICABILITY

Figure 16:
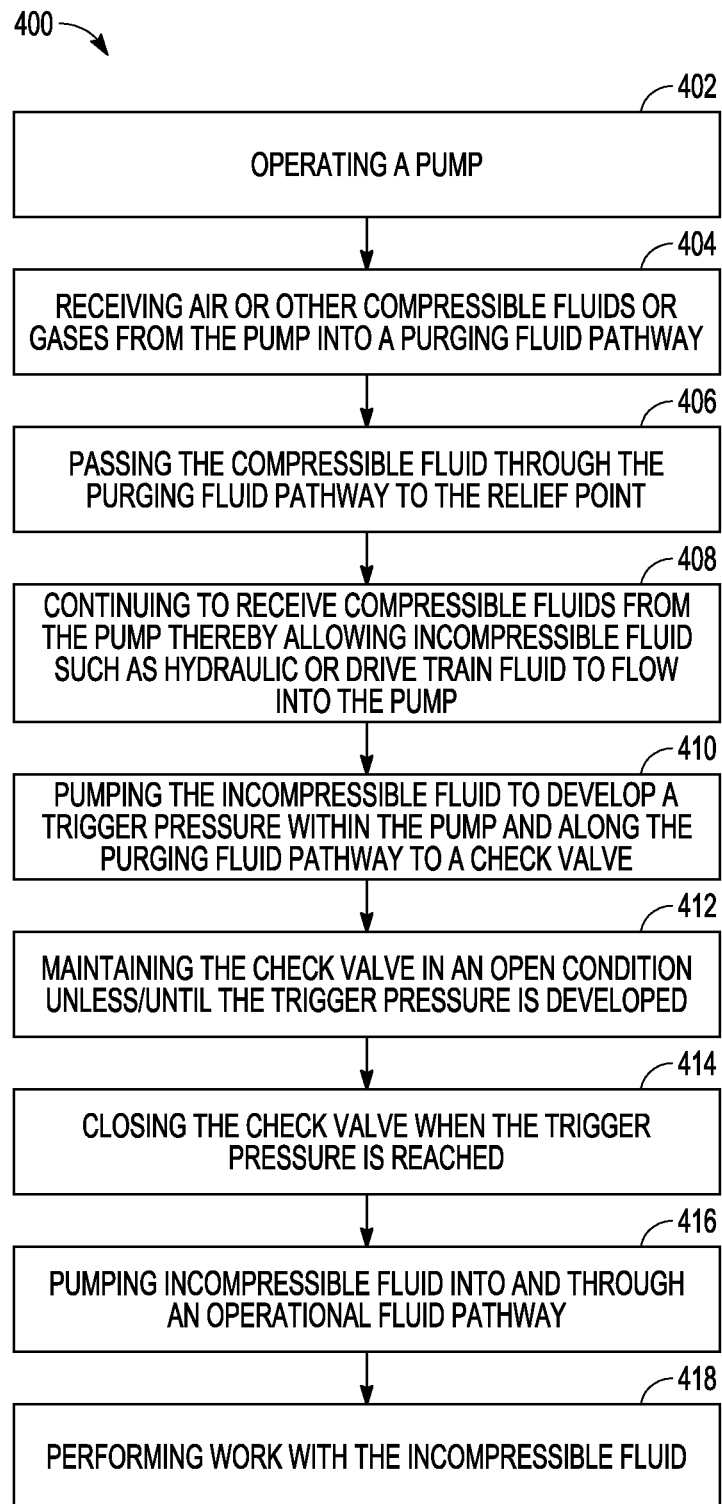
FIG. 16 is a method diagram depicting a method of operation of a pump with a purge valve, according to one or more embodiments.

In operation and use, the present pump configuration including a purge valve may provide for clearing air or other gases from a pump to remove or remedy an airlock condition of the pump and reduce damage from cavitation erosion. For example, as shown in FIG. 16, a method of clearing an airlock 400 may include operating a pump 402. The method may also include receiving air or other compressible fluids or gases from the pump into a purging fluid pathway 404 extending from the pump to a relief point so as to bypass an operational fluid pathway. The method may also include passing the compressible fluid through the purging fluid pathway to the relief point 406. The method may also include continuing to receive compressible fluids from the pump thereby allowing incompressible fluid such as hydraulic or drivetrain fluid to flow into the pump 408. The method may also include pumping the incompressible fluid to develop a trigger pressure within the pump and along the purging fluid pathway to a check valve 410. The method may also include maintaining the check valve in an open condition unless/until the trigger pressure develops within the pump and along the purging fluid pathway to the check valve 412. The method may also include closing the check valve when trigger pressure is reached 414. The method may also include pumping incompressible fluid into and through an operational fluid pathway 416. The method may also include performing work with the incompressible fluid 418.

What is claimed is:

1. A pump, comprising:
    a housing defining a pump cavity;
    an inlet on a first side of the housing in fluid communication with the pump cavity;
    an outlet on a second side of the housing opposite the first side and in fluid communication with the pump cavity and defining an operational fluid pathway between the inlet and the outlet;
    a pump mechanism arranged within the pump cavity and along the operational fluid pathway;
    a purging fluid pathway having a purge inlet formed in the housing on a downstream side of the pump mechanism along the operational fluid pathway, the purging fluid pathway extending through the housing to an exterior surface of the housing and to an inlet of another pump; and
    a purge valve arranged along the purging fluid pathway, the purge valve configured to remain open unless a triggering fluid pressure develops in the pump mechanism and remain closed unless a fluid pressure in the pump mechanism drops below the triggering fluid pressure.

2. The pump of claim 1, wherein the purge valve is a spring open check valve.

3. The pump of claim 2, wherein the spring open check valve is biased in an open direction opposite the fluid flow direction.

4. The pump of claim 1, wherein the purge valve is arranged in the purge inlet.

5. The pump of claim 1, wherein the purging fluid pathway comprises a purge bore extending from the pump cavity to a transition passage and an outlet passage extending from the transition passage to the exterior surface of the housing.

6. The pump of claim 1, further comprising a fitting positioned at the exterior surface of the housing.

7. The pump of claim 6, further comprising a hose extending from the fitting to a relief point to the inlet of the another pump.

* * * * *